United States Patent [19]

Kritselis

[11] Patent Number: 4,721,347

[45] Date of Patent: Jan. 26, 1988

[54] CABINET DRAWER LOCKING SYSTEM

[75] Inventor: George N. Kritselis, Wooddale, Ill.

[73] Assignee: The Remline Tool Storage Company, Inc., Yorkville, Ill.

[21] Appl. No.: 17,320

[22] Filed: Feb. 20, 1987

[51] Int. Cl.4 .................................................. C05C 9/10

[52] U.S. Cl. ...................................... 312/219; 312/221

[58] Field of Search ............... 312/215, 216, 217, 218, 312/219, 220, 221, 222, 333; 292/48, 223; 70/85

[56] References Cited

U.S. PATENT DOCUMENTS

| | | | |
|---|---|---|---|
| 410,378 | 9/1889 | Rodeheaver | 312/219 |
| 1,318,011 | 10/1919 | Schiavone | 312/219 |
| 2,171,663 | 9/1939 | Marchand . | |
| 2,180,630 | 11/1939 | Hearn | 312/218 |
| 2,747,960 | 5/1956 | Ambrosino | 312/219 |
| 2,842,419 | 5/1929 | Howard | 312/222 X |
| 3,497,280 | 2/1970 | Olree et al. . | |
| 3,776,007 | 12/1973 | Himsl | 312/219 X |
| 4,057,306 | 11/1977 | Resch | 312/220 X |
| 4,057,307 | 11/1977 | Scheerhorn | 312/219 |

*Primary Examiner*—Joseph Falk

*Attorney, Agent, or Firm*—Donald A. Peterson

[57] ABSTRACT

An improved cabinet drawer locking system is provided which permits a user to lock the cabinet drawers by placing the system in the locked position after closing the drawers and/or by placing the system in the locked position and then closing the drawers. The system includes a key actuated lock and a shaft, rotatably mounted in the cabinet and connected at one end to the lock. The shaft includes an offset lever at the end opposite the end connected to the lock. This lever drives a linkage which engages a spring-biased latch bar. The latch bar co-acts with a cooperating member secured to the drawers of the cabinet to lock and unlock the drawers. In operation, the lock rotates the shaft and the offset lever; and the linkage transmits this motion to the latch bar to move the latch bar between a locked and an unlocked position.

9 Claims, 5 Drawing Figures

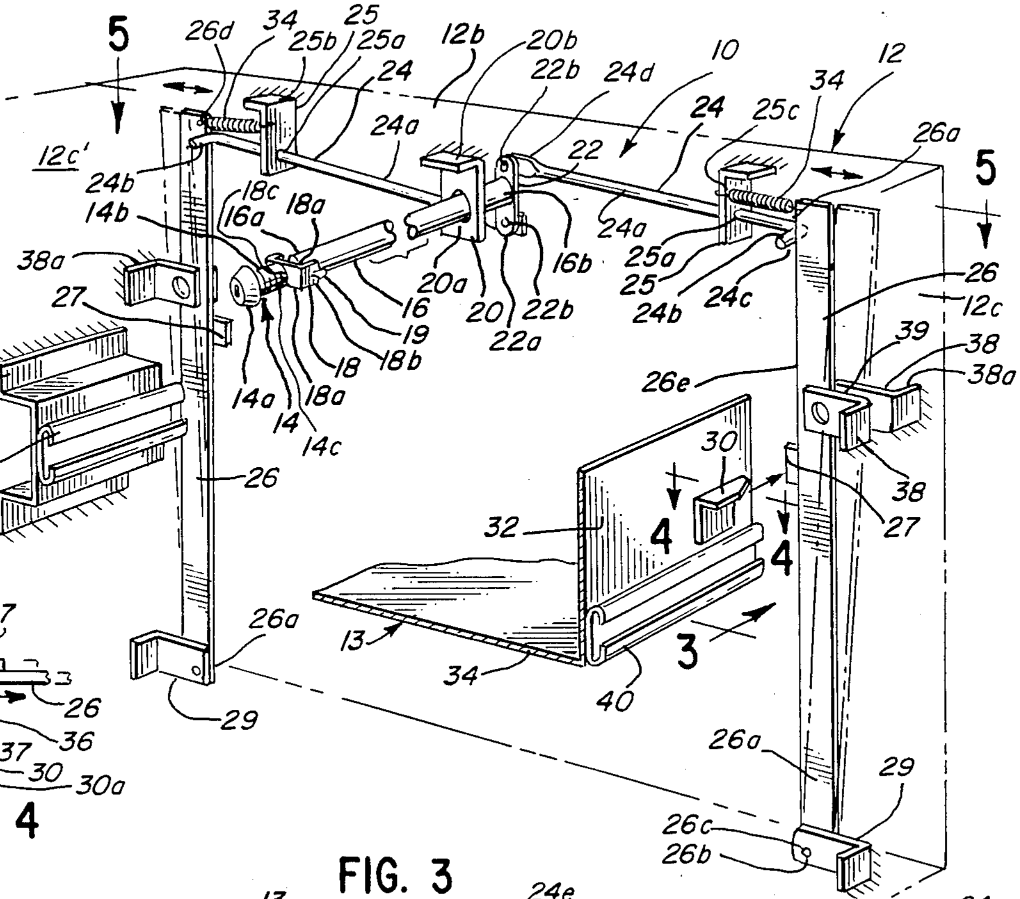
FIG. 2
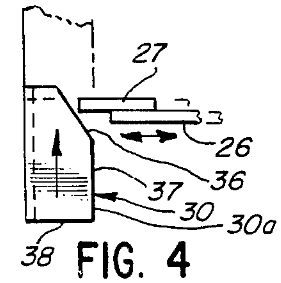
FIG. 4
FIG. 3
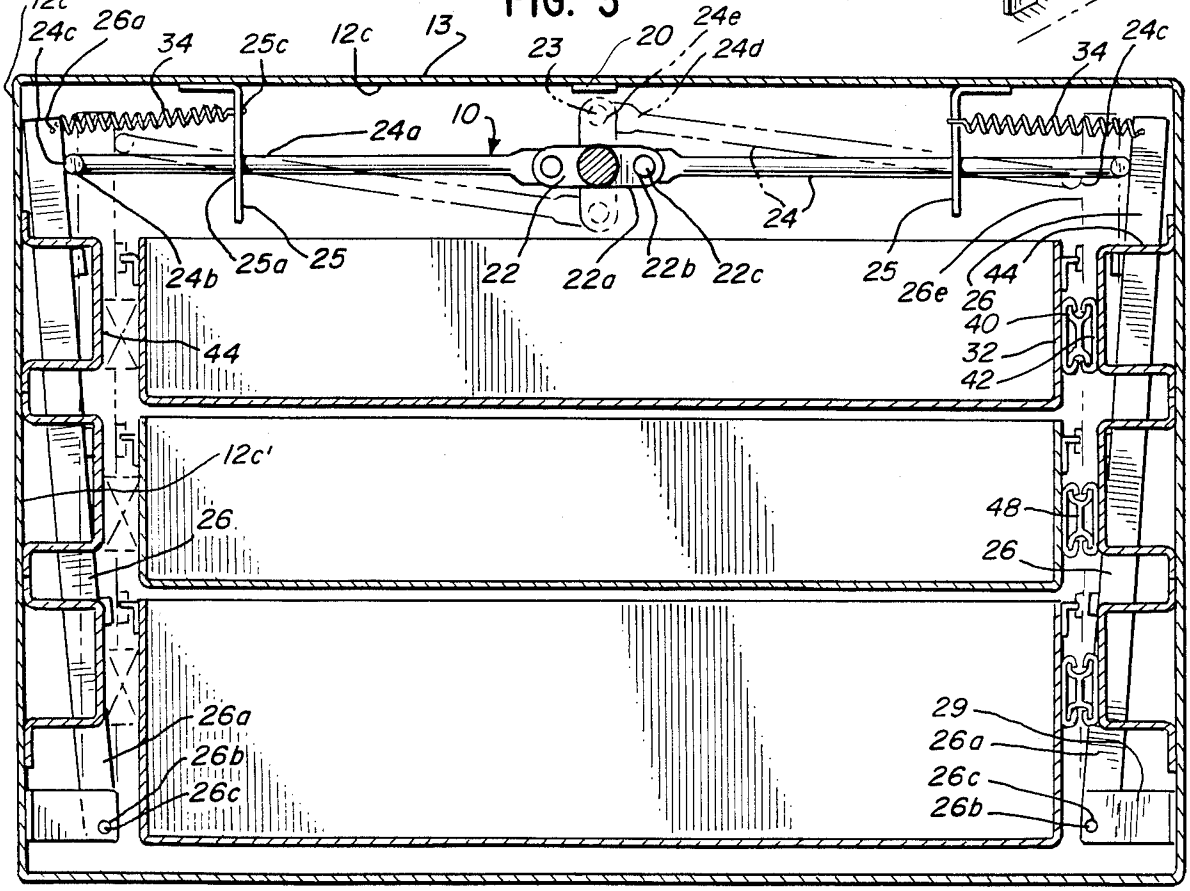

CABINET DRAWER LOCKING SYSTEM

FIELD OF INVENTION

This invention relates to an improved simplified drawer locking mechanism for sliding drawer tool chests, file cabinets or the like in which cabinets which contain a single drawer or a plurality of drawers which may be closed, secured and locked when the cabinet drawer locking mechanism is in the drawer locking and securing position.

BACKGROUND OF THE INVENTION

This invention relates to a locking system for cabinets such as file or tool cabinets or the like. More particularly the invention relates to simple and improved drawer securing mechanisms and systems which permit the locking of drawers in a cabinet by operation of the mechanism to a locked and unlocked position and additionally permits the locking of drawers which were left open after the mechanism is placed in the locking mode without the necessity of shifting the key operated lock means to the unlocked position.

DESCRIPTION OF THE PRIOR ART

In the prior art cabinet locking mechanisms, it is customary arrangement to provide a locking system which requires that the cabinet lock system be in the unlocked position and all of the drawers be fully closed before the lock is set to the locked position and the drawers are then located in the locked and secure position by actuation of the lock. Such prior art multiple drawer locking mechanisms for desks and file cabinet may be exemplified by Scheerhor U.S. Pat. No. 4,057,307 (1977); Himel U.S. Pat. No. 3,776,007; Scavone U.S. Pat. No. 1,318,011 (1919); in Rodebearer, U.S. Pat. No. 410,378 (1889).

One of the objects of the present invention is to provide a locking system for the locking of a plurality of sliding drawers in a cabinet which mechanism or apparatus also permits those drawers remaining open to be closed and locked when the drawer locking mechanism is in the locked position without the necessity of placing the locking mechanism in the unlocked position. Unlocked drawers which are partially open may be locked simply by driving them home to the closed position and the locking mechanism automatically locks and secures the drawer on its closure.

DESCRIPTION OF THE DRAWINGS

FIG. 2 is a fragmentary partial perspective view illustrating the locking mechanism of the present invention installed in the interior of a sliding drawer cabinet of the type shown in FIG. 1;

FIG. 3 is a vertical elevation in partial section of the mechanism installed in the rear of a cabinet taken rearwardly along the lines 3—3 of FIG. 2.

FIG. 4 is a partial top plan view illustrating the cooperating coaction of locking mechansim that is affixed to the side of a movable drawer with the latch bar means of the locking mechanism of FIGS. 2 and 3.;

SUMMARY OF THE INVENTION

Figure 1:
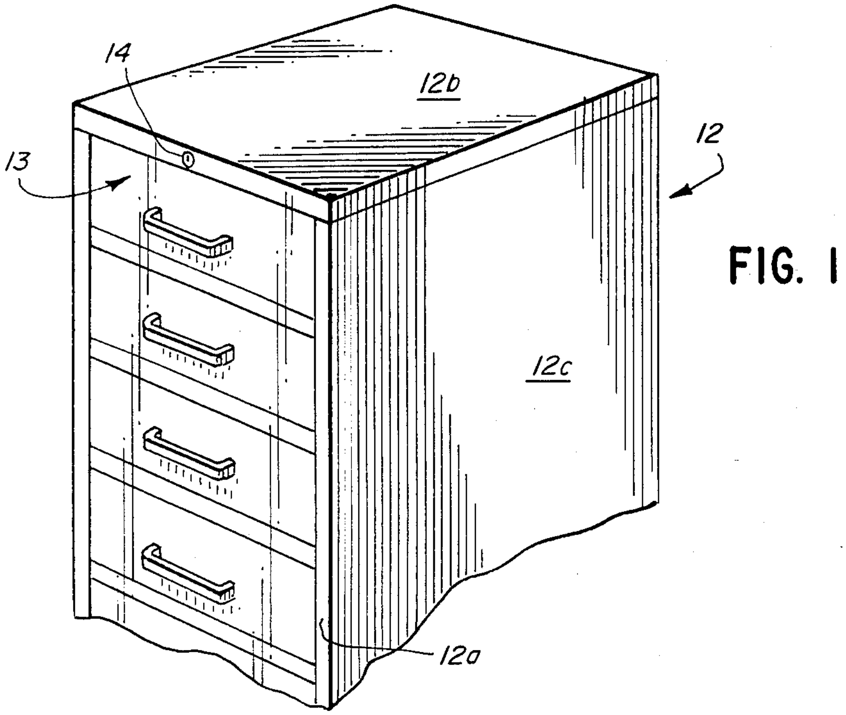
FIG. 1 is a perspective view of the exterior of an embodiment of a sliding drawer tool or file cabinet of the type wherein the locking mechanism and apparatus of the present invention is installed.

The present invention relates to an improved drawer locking mechanism and apparatus for sliding drawer tool cabinets comprising in combination with a cabinet having a plurality a drawers slidably located therein, a key actuated lock means located in said cabinet, a shaft mounted in said cabinet rotatably driven by and responsive to the lock means, having an offset lever means mounted at the other end thereof, linkage means connected at one end thereof to said offset means said linkage means cooperatively coacting at the other end thereof with a latch bar means pivotably mounted in said cabinet; spring bias means for urging the latch bar to a locked and drawer securing position, latch bar engaging means mounted on sliding drawers, said latch bar engaging means including first means for the slidably and angularly engaging and moving said latch bar means against the spring bias from a locked to an unlocked position actuated by drawer closure and said latch bar engaging means including a second means for engaging said latch bar means moved to a locked position to secure the drawers in a locked position.

DETAILED DESCRIPTION OF THE PREFERRED EMBODIMENTS INVENTION

For a more complete understanding of the present invention reference is made to the attached drawings illustrating in a sliding drawer cabinet the drawer locking mechanism 10 of the invention installed in rear portion of a cabinet such as a tool cabinet or chest 12 containing a plurality of drawers 13.

The locking mechanism 10 comprises a key actuated cylinder lock 14 mounted at the top front 12*a* of the cabinet 12. The lock 14 is attached and connected through a linkage to a rotatable shaft means 16 mounted in the upper interior part of said cabinet, said shaft having an offset lever arm means 22 mounted at one end thereof pivotally connected to a pair of linkage rods 24 linking the offset means to operate a latch means 26 pivotally mounted at the side rear of the cabinet interior which latch bar means is adapted to engage locking or means 30 located on and secured to the rear sides 32 of drawers 13 mounted in the cabinet 12.

The key operated cylinder lock means 14 is of conventional design and is provided with a front face 14*a* with a key opening and a retaining flange, a rearwardly extending threaded lock cylinder or barrel 14*b* on which is conventionally mounted a ring nut 15 which nut when drawn down on the threaded barrel secures the lock 14 to the metal panel forming the top front 12*a* of the cabinet 12 between the flange 14*a* and the nut. The rearwardly extending barrel 14*b* of the lock 14 is provided at its rear end 14*c* with a non slip engagement such as a hexagonal or square shaped post or end (not shown).

A generally U-shaped linkage bracket 18 is provided which is affixed to the non-slip engagement at 14*c* and comprises a cross bar 18*a* having an aperture 18*c* for complementary fitted engagement with the post or end 14*c* of lock 14. The cross bar 18*a* has a pair of side arms 18*b* at each end thereof. The ends of bracket sides 18*b* are each provided with apertures to receive a cotter pin or similar fastener 19, which also passes through an aperture (not shown) formed in the engagement end of post at 14c and apertures formed in the front end 16a of the tubular shaft 16 which are in the form of drilled holes to receive the cotter pin 19 which passes through the apertures or holes in the side arms 18b of the bracket 18, thereby linking the shaft 16 and the lock 14 together in a demountable arrangement. The shaft 16 extends rearwardly from its connection (through bracket or connector 18) with the key lock 14 at 16a to a point just short of and spaced from the interior rear wall 12b of cabinet 12. The rearwardly extending portion of shaft 16 is rotatably mounted in a aperture 20a formed in an L-shaped mounting bracket 20, which bracket in the embodiment shown, is affixed at its other end to and is supported by and on the lower surface 12b of the cabinet top 12b at its tab 20b.

The other or far end 16b of shaft 16 (opposite its connection with lock 14) is provided with a lever arm element 22 having arms 22a of which extend outwardly at right angles to and are offset from the shaft 16 for a predetermined distance. Apertures 22b are formed in the ends of lever arms 22a for pivotal connection by means of pins 22c with a pair of L-shaped linkage rods 24. Each linkage rod 24 is formed with an elongated straight sector 24a which is integrally formed such as by bending the rod at its end at essentially right angles to sector 24a, to form a foot 24b or an L-shaped sector of rod 24 to thereby provide a latch engaging surface or portion 24c of 24b which extends parallel to the side walls 12c of the cabinet 12 for engagement with latch bar 26. The other end 24d of the rod 24 is flattened and provided with an aperture 24e to receive a pivot pin 23 or similar device which passes through apertures of rods and the apertures 22b in each of the lever arms 22a to provide a movable pivotal linkage between the rods 24 and lever arms 22 driven by rotation of shaft 16 and the key lock 14 to convert the rotational movement of shaft 16 to lateral movement of the rods 24.

The elongated shaft portion 24a of the linkage rods 24 is slidably supported in apertures 25a formed in an L-shaped tab 25, the other end 25b of said tabs being affixed to and supported by the top lower surface 12b' of the cabinet 12 by conventional means such as welding, high strength glue, brazing or riveting. A pair of latch bars 26 of flat strip like form are pivotally mounted in the cabinet at their respective lower ends 26a to pivot laterally (to the sides of the cabinet) from a pivot point 26b. The bottom pivot 26b of latch bar 26 is pivotally mounted by a pin 26c on an angularly formed bracket 29 which is secured at 29a to the inner surface 12c' of side walls 12c of cabinet 12 by welding, riveting or other means. The latch bars 26 are provided with lateral, inwardly extending engagement tabs 27 affixed at predetermined intervals to the flat surface of the latch bars 26 for engagement with sliding lock means elements 30 which are mounted on the rear portions of the outer side walls 32 of the drawers 13.

A coil spring 34 is affixed through holes 26d formed in the top end of each latch bar 26, the spring 34 extending to and between bar 26 and tab 25 to bias each of the latch bars 26 inwardly and against the outer surface or edges 24c of the free ends of the rods 24 to a latching or drawer locking position.

A pair of spaced apart L-shaped guide brackets 38 are mounted on and secured to the inner side walls 12c' of cabinet 12 at tabs 38a. The spacing between the pairs of brackets 38 is such as to provide a space 39 to permit the latch bar 26 to slide therebetween laterally (parallel to front 12a) in response to the urging of spring 34 or the movement of the rod ends 24c sliding against the inner edge 26e of the latch bars 26.

Figure 5:
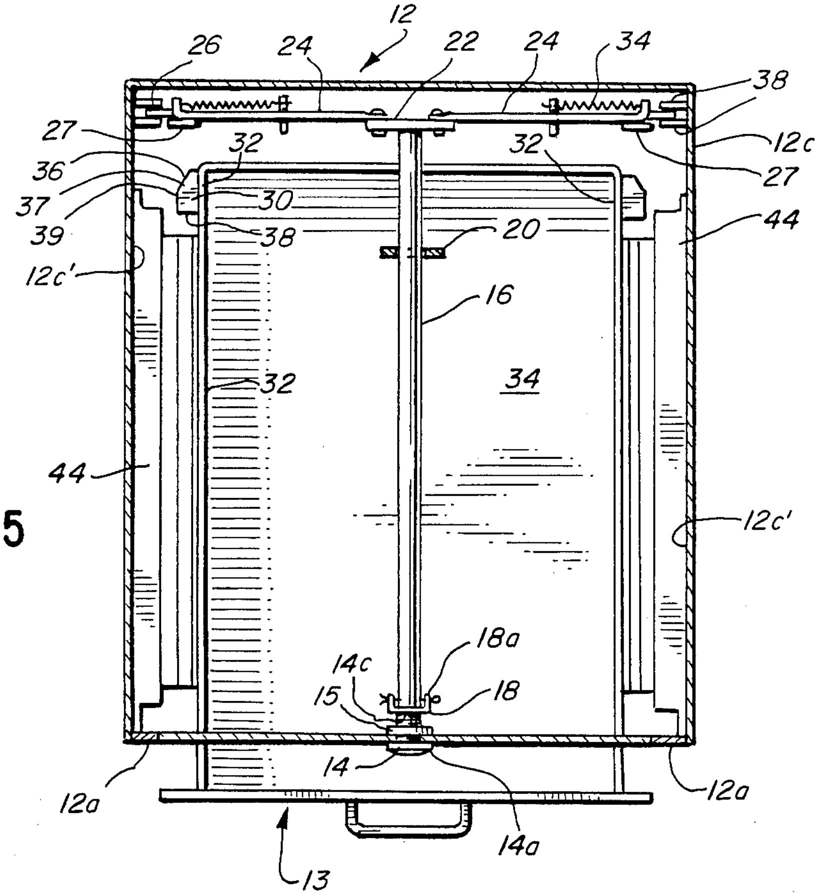
FIG. 5 is a top plan and section view of locking apparatus in place looking downward along the line 5—5 of FIG. 2.

As indicated above, sliding latch engaging means or lock elements 30 are affixed to the outer surface of drawer sidewalls 32 extending upwardly from drawer bottom 34 of drawers 13, said lock elements 30 extending laterally outwardly thereof. The sliding lock element 30 (See FIGS. 2, 4 and 5) are flat elements which are generally rectangular in shape having an angular or bias cut corner or edge means 36 extending from the front edge to the side of the lock element 30. The sliding lock element 30 with its angular corner or edge 36 is mounted on drawer sides 32 so as to, in the preferred form shown, slidably engage a lock tab 27 mounted in a predetermined cooperative position on latch bars 26 when the latch bar is in the locked position as shown in FIGS. 1 and 2. A rear latch securing edge or means 38 is provided on 30 to engage the tab 27 on latch bar 26 after the drawer is closed and tab 27 on bar 26, urged by spring 34, drops behind edge 38 of lock element 30. The drawers 13 are slidably mounted in the cabinet 12 by means of a sliding C-shaped rails 40 on the lower portion of drawer side walls 32 which coact with similar C-shaped drawer glide units 42 affixed to spacers or mounting brackets 44 mounted on the inner surface of side walls 12b of cabinet 12. The mounting brackets 44 are designed so that the drawer 34 can freely slide in front opening 12d in the front 12a of cabinet 12.

The C-shaped elements 40 and 42 are connected with a linkage 48 (See FIGS. 2 and 3) comprising a metal strip having a C-shaped channel 50 formed at its top and bottom edges. The channels 50 are so formed as to grip the top and bottom edges 52 of the fixed C-shaped drawer glide elements 48 to support the drawers in a sliding fashion.

In operation, a key inserted in the lock means 14 is adapted to rotate shaft 16 about 90°, moving the lever arms 22a between a vertical locking position or a horizontal unlocking position. In the unlocked position, the arms 22a, responding to rotation of shaft 16 are horizontally positioned to drive the rods 24 laterally outwardly from the axis of shaft 16 causing the edges 24c of rods 24 to engage the edge 26e of latch bar 26 and force the latch bar and its tab 27 outwardly against the inwardly-directed spring bias or pressure exerted by coil spring 34 free and away from means 38. In the locked position also shown by broken lines in FIG. 3, the arms 22a and latch bar 26 is in an essentially vertical position and the tabs 27 mounted thereon are moved inwardly to engage the read edge of means 38 of lock element or means 30. In the unlocked position the drawers 13 are freely movable in the cabinet slides and may be drawn out to provide access to their contents during normal usage of such a cabinet.

To actuate the drawer locking and securing mechanism, the shaft 16 through key lock means 14 is rotated to 90° from the unlocked position to where lever arms 22a are in the vertical position drawing in rods 24 and their engaging edges 24e and permitting the latch bars 26 and tabs 27 to rotate inwardly of the cabinet side walls 12b under the urging of spring bias provided by spring 34 affixed to latch bars 26 and anchored at tab 25.

With the locking mechanism or apparatus in the latched or locked position, the tabs 27 on latch bars 26 fall behind locking edge 38 of the lock tabs 30 mounted on the sides 32 of drawer 13 and preclude withdrawal of the drawer when a drawer is in the fully closed position. When the locking mechanism 10 is in the closed and drawer securing positions, any drawers 13 which are partially withdrawn and open (see FIG. 5), may also be closed and locked without the necessity of placing the locking mechanism 10 in the unlocked position. In such a case the open drawer is merely closed and the angled edge 36 of each latch engaging means 30 slidingly engages the tabs 27 mounted on latch bars 26 driving the latch bar 26 and its associated tab outwardly against the spring bias exerted by 34. While the apparatus shown and illustrated herein includes a locking mechanism or apparatus which latches or locks by engagement of means on both sides of the drawers, it is obvious that a similar locking result can be achieved by using only one of the pairs of latch means and associated means shown. As the partially open drawer progresses to the fully closed position, the tabs 27 ride over angled edge 36, and along side edge 37 and after the drawer 34 is fully closed, the tabs 27 on bar 26 drops behind edge 38 by reason of spring bias exerted by spring 34, to lock the drawer in the cabinet.

The mechanism 10 provides a secure drawer locking mechanism for cabinets which protects the contents from loss or pilferage when in the locking and secure mode. At the same time drawers remaining open when the lock mechanism is set to the locked position may be conveniently closed and locked by the simple expedient of closing the drawers which automatically lock when fully closed.

I claim:

1. An improved drawer locking apparatus for use in a sliding drawer cabinet having at least one drawer, said apparatus comprising: a key operated lock means mounted in said cabinet, a shaft means rotatably mounted in said cabinet connected at its one end to said key lock means and extending rearwardly in said cabinet and having at it other end and offset lever means, linkage means mounted at the rear interior of said cabinet pivotly connected at one end thereof to said lever means and having a latch bar engaging surface at its other end, a spring biased latch bar means pivotly mounted at the rear of said cabinet said latch bar means being pivotal between a latch and unlatch position against said spring bias by coaction with said latch engaging surface of said linkage means, and a latch bar engaging and locking means on said drawer including one surface means adapted to maintain said drawer in a locked position when the drawer is closed by engagement with said latch bar means and a second means on the latch bar engaging and locking means for slidably engaging and displacing said latch bar means against the spring bias to an unlocked position.

2. Apparatus according to claim 1 wherein said latch bar engaging means includes an angled surface edge for angular and sliding engagement with and displacement of said latch bar means in the locked position when the drawer is being closed and having a second latch bar engaging surface means adapted contact said latch bar means to secure the drawer in the locked position when the drawer is closed and the latch bar means is displaced to its drawer latching position.

3. Apparatus according to claim 1 including a series of linkage means between the key lock means and the latch bar means whereby movement of said key lock means between a locked and unlocked position is adapted to cause rotation of the said shaft, offset lever means and associated linkage means to cause the engagement surface of said linkage arms connected thereto to slidably engage and move the latch bar laterally between a drawer locking and unlocked position with respect to said latch bar engaging means.

4. Apparatus according to claim 1 wherein the key lock means is mounted in the top front of the cabinet.

5. Apparatus according to claim 1 wherein said shaft means is mounted in the interior top of said cabinet and the associated linkage and latch bar means are mounted respectively in the top, rear, and side interior locations of said cabinet.

6. Apparatus according to claim 1 wherein said latch bar is pivotally mounted at its lower end and is provided with plurality of laterally extending detent locking tabs mounted therein in predetermined spaced positions for engagement and disengagement with a plurality of latch bar engaging means mounted in the rear sides of a plurality of sliding drawers mounted in said cabinet by the pivotal movement of said latch bar means.

7. Apparatus according to claim 1 wherein said drawer locking apparatus includes a pair of said linkage means extending laterally to the rear sides of the cabinet, coacting with a pair of latch bar means mounted respectively at each interior rer side of the cabinet to coact with a plurality of latch engaging means mounted on each of the rear sides of a plurality of sliding drawers mounted in said cabinet.

8. An improved drawer locking apparatus for use in a drawer cabinet having sliding drawer means, said apparatus comprising: a key actuated lock means including an exterior key access means mounted in the front of said cabinet, a rearwardly extending rotatable shaft mounted in said cabinet connected with and responsive to rotational movement of said key lock means and having offset lever means affixed thereto, linkage means connected to said lever means laterally movable and responsive to rotational movement of said shaft and associated key lock means, and spring biased latch bar means rearwardly mounted in said cabinet responsive to lateral movement of said linkage means between a locking and unlocked position and a latch bar engaging and locking means affixed to the side of said drawer means, including a first means adapted to urge said latch means against said spring bias from a locked or latching position to an unlocked position by the closure movement of said drawer means and including a second means to secure and lock the said drawer means by engagement with said latch means when the said latch means are in the lock position and said drawer means are fully closed.

9. An improved lockable sliding drawer cabinet which comprises:

(a) a cabinet body having top, side, front and rear walls, and defining a drawer receiving cavity and opening in the front surface thereof;

(b) a plurality of drawers slidably mounted in tracks, mounted between the interior side walls of said side walls of and within said cabinet;

(c) a key operated locking means mounted in the top front of said cabinet;

(d) a shaft means cooperatively connected with said key lock means extending rearwardly in said top interior of said cabinet including an offset lever means located thereon;

(e) a linkage means connected to said offset lever means slidably mounted in the rear interior of said cabinet;

(f) a spring biased latch bar means pivotally mounted in the rear interior sides of said cabinet and movable against said spring bias in response to movement of said linkage means;

(g) a latch bar engaging means mounted in the rear sides of said drawers having first angled surface means for exerting sliding pressure against said latch bar and its associated spring bias to thereby urge said latch bar to an unlatched position responding to closing movement of the drawer and having a second latch engaging surface means positioned to permit said latch bar to return to a drawer locking and securing position urged by spring bias when the drawer is fully closed whereby said second surface means engages said latch bar means in a drawer locking and securing mode.

* * * * *